(12) United States Patent
Yarbrough

(10) Patent No.: US 8,393,871 B2
(45) Date of Patent: Mar. 12, 2013

(54) WIND TURBINE BLADE SHEAR WEB CONNECTION ASSEMBLY

(75) Inventor: Aaron Yarbrough, Clemson, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/185,670

(22) Filed: Jul. 19, 2011

(65) Prior Publication Data
US 2012/0027612 A1 Feb. 2, 2012

(51) Int. Cl.
*F03D 1/06* (2006.01)

(52) U.S. Cl. .............. 416/226; 416/229 R; 416/233

(58) Field of Classification Search ............... 416/224, 416/226, 232, 233, 229 R, 230, 241 A; 244/123.1, 244/123.2, 123.7, 123.8, 123.13, 123.5, 123.6
See application file for complete search history.

(56) References Cited

U.S. PATENT DOCUMENTS

| | | | |
|---|---|---|---|
| 2,503,450 A | 4/1950 | Nebesar | |
| 3,771,748 A | 11/1973 | Jones | |
| 4,643,646 A | 2/1987 | Hahn et al. | |
| 4,671,470 A | 6/1987 | Jonas | |
| 5,476,704 A | 12/1995 | Kohler | |
| 6,234,423 B1 | 5/2001 | Hirahara et al. | |
| 6,513,757 B1 * | 2/2003 | Amaoka et al. | 244/123.7 |
| 6,520,706 B1 | 2/2003 | McKague et al. | |
| 6,800,956 B2 | 10/2004 | Bartlett | |
| 6,945,727 B2 * | 9/2005 | Christman et al. | 244/132 |
| 6,964,723 B2 | 11/2005 | Lindsay et al. | |
| 7,037,568 B1 * | 5/2006 | Rogers et al. | 428/119 |
| 7,179,059 B2 | 2/2007 | Sorenson et al. | |
| 7,244,487 B2 * | 7/2007 | Brantley et al. | 244/123.7 |
| 7,258,828 B2 | 8/2007 | Fish | |
| 7,371,304 B2 | 5/2008 | Christman et al. | |
| 7,393,488 B2 | 7/2008 | Grose et al. | |
| 7,625,623 B2 | 12/2009 | Grose et al. | |
| 7,810,757 B2 | 10/2010 | Kirkwood et al. | |
| 7,841,835 B2 * | 11/2010 | Bagepalli et al. | 416/226 |
| 7,897,095 B2 | 3/2011 | Raeckers | |
| 8,075,275 B2 | 12/2011 | Althoff et al. | |
| 2003/0037867 A1 * | 2/2003 | Bersuch et al. | 156/245 |
| 2006/0225278 A1 | 10/2006 | Lin et al. | |
| 2007/0036659 A1 | 2/2007 | Hibbard | |
| 2007/0110584 A1 * | 5/2007 | Stommel | 416/233 |
| 2009/0087318 A1 | 4/2009 | Althoff et al. | |
| 2009/0208701 A1 | 8/2009 | Grose et al. | |
| 2010/0135815 A1 | 6/2010 | Bagepalli et al. | |
| 2010/0135817 A1 | 6/2010 | Wirt et al. | |

(Continued)

FOREIGN PATENT DOCUMENTS

WO  WO-2009/155920 A1 * 12/2009

OTHER PUBLICATIONS

Danish Search Report, Nov. 7, 2012.

*Primary Examiner* — Christopher Verdier
(74) *Attorney, Agent, or Firm* — Dority & Manning, P.A.

(57) ABSTRACT

A wind turbine blade has upper and lower shell members with a respective spar cap configured on an internal face of the shell members. A shear web extends between the spar caps along a longitudinal length of the blade. A connection assembly is configured between the transverse ends of the shear web and the spar caps. The connection assembly includes a spacer member configured on the spar cap. A male/female engagement interface is defined between transverse end of the shear web and the spacer member, and includes an axial extension length to accommodate for variances in shear web length.

9 Claims, 4 Drawing Sheets

U.S. PATENT DOCUMENTS

| | | |
|---|---|---|
| 2010/0143143 A1 | 6/2010 | Judge |
| 2010/0162567 A1* | 7/2010 | Kirkwood et al. ............ 29/897.2 |
| 2011/0008175 A1* | 1/2011 | Gau .............................. 416/233 |
| 2011/0081247 A1 | 4/2011 | Hibbard |
| 2011/0142663 A1 | 6/2011 | Gill |
| 2011/0176928 A1 | 7/2011 | Jensen |
| 2012/0027610 A1 | 2/2012 | Yarbrough |
| 2012/0027613 A1 | 2/2012 | Yarbrough |
| 2012/0027614 A1 | 2/2012 | Yarbrough |
| 2012/0027615 A1 | 2/2012 | Irizarry-Rosado et al. |

* cited by examiner

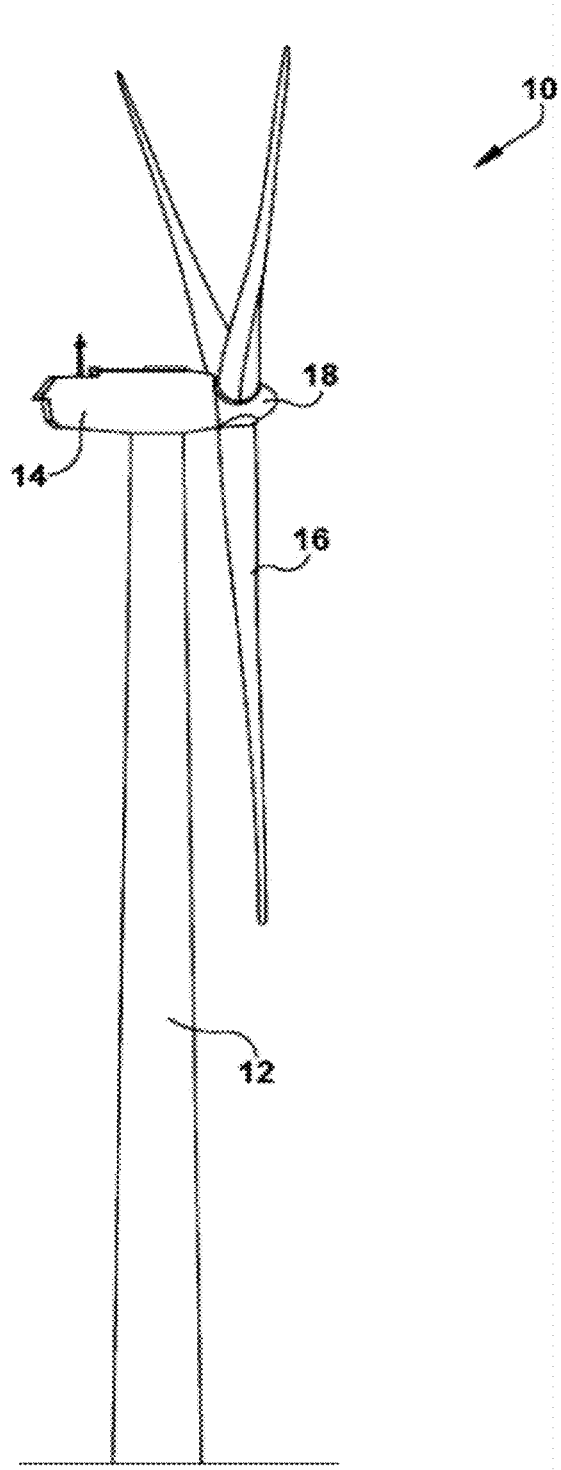
Fig. -1-
Prior Art

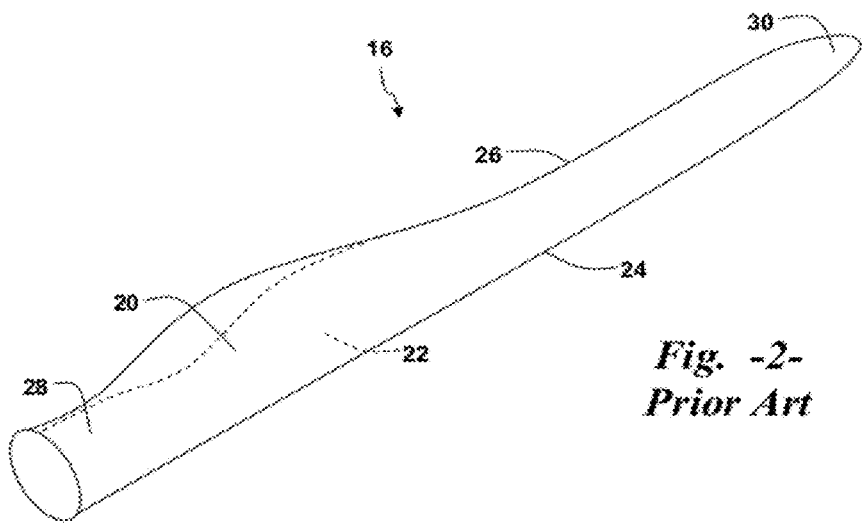
Fig. -2-
Prior Art
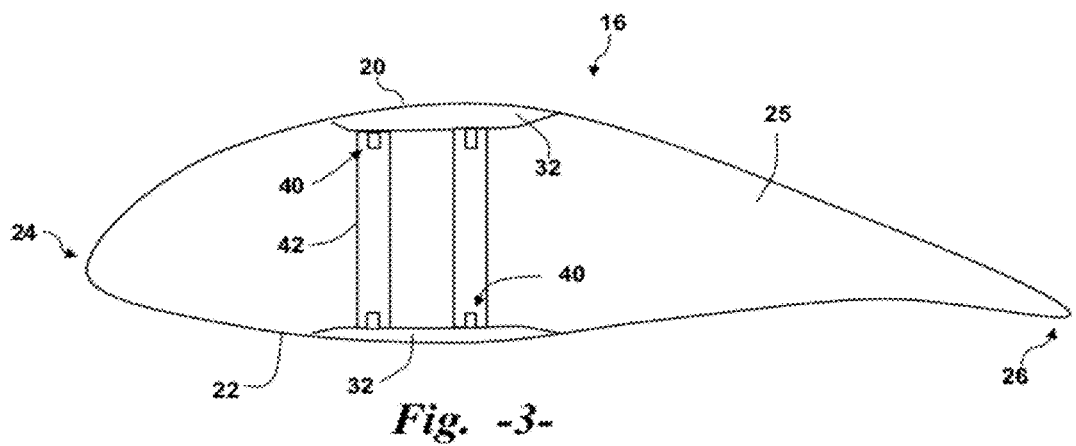
Fig. -3-

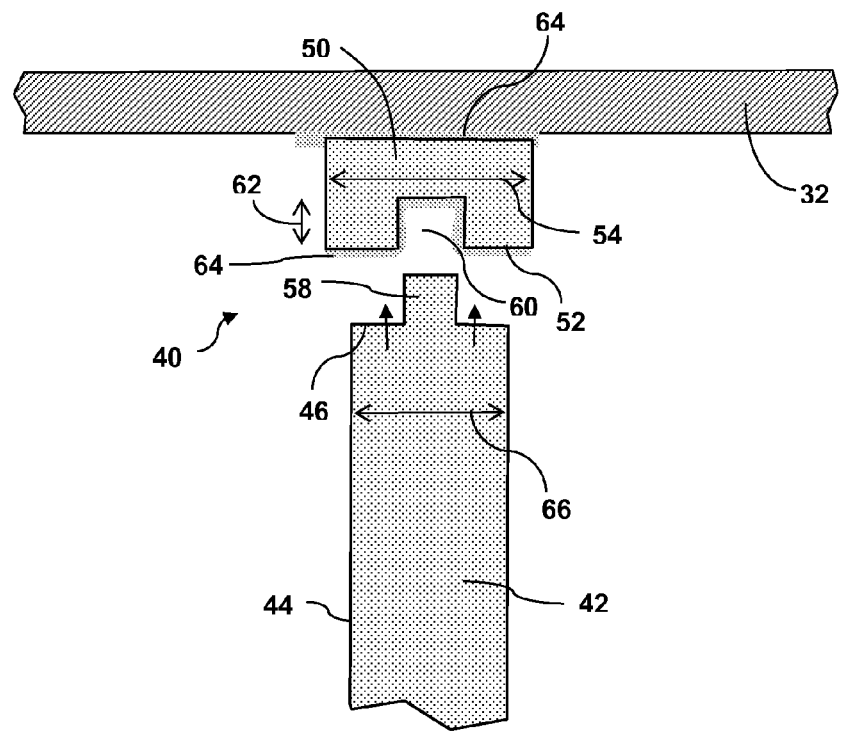
Fig. -4-
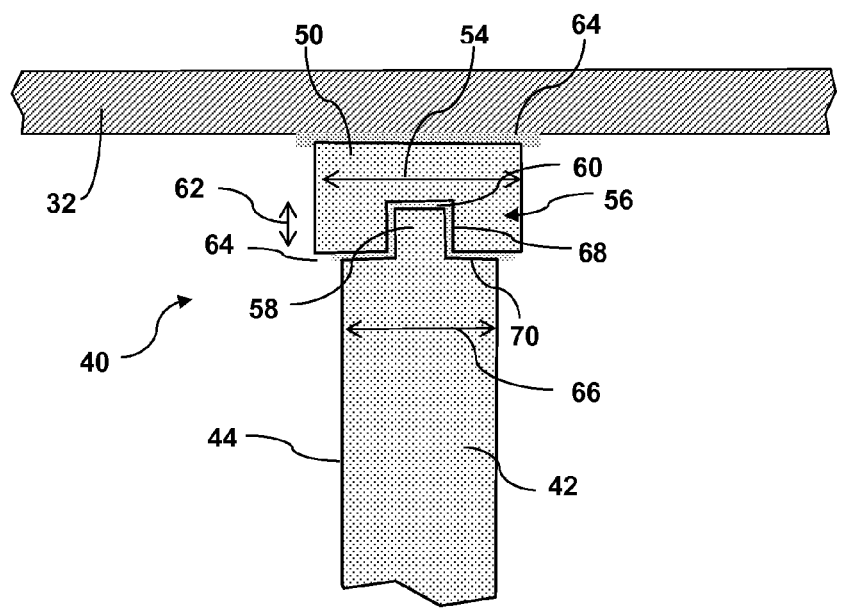
Fig. -5-

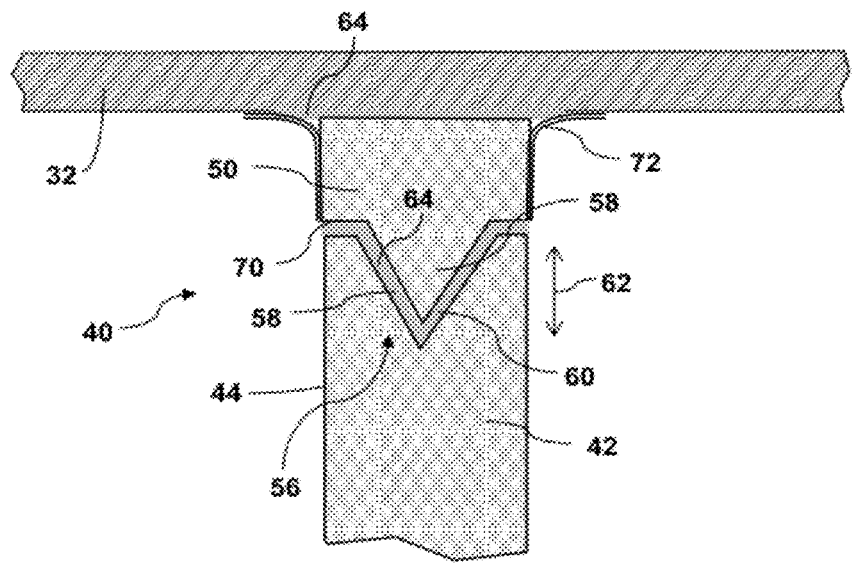
Fig. -6-
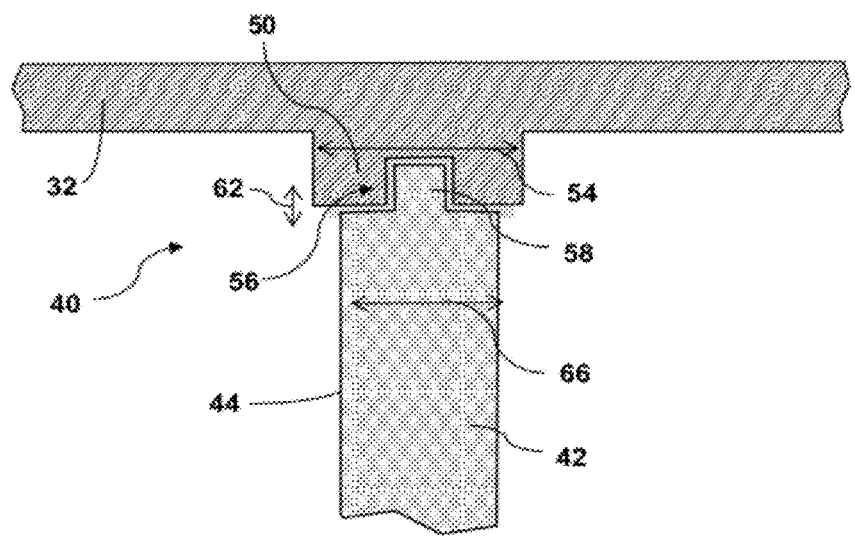
Fig. -7-

WIND TURBINE BLADE SHEAR WEB CONNECTION ASSEMBLY

FIELD OF THE INVENTION

The present invention relates generally to the field of wind turbines, and more particularly to the shear web configuration within the wind turbine blades.

BACKGROUND OF THE INVENTION

Turbine blades are the primary elements of wind turbines for converting wind energy into electrical energy. The blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

The turbine blades typically consist of a suction side shell and a pressure side shell that are bonded together at bond lines along the trailing and leading edges of the blade. An internal shear web extends between the pressure and suction side shell members and is bonded to spar caps affixed to the inner faces of the shell members. Relatively exact length dimensions are required for the spar web to span between the spar caps and achieve a bond between the spar cap and shear web having sufficient width and thickness dimensions. Achieving these dimensions, as well as an adequate bond, can be difficult and the juncture between the spar caps and shear web is a time-consuming and tedious process that often requires significant re-work.

With typical blade constructions, a rigid flange is used to achieve the desired bond width for bond paste applied between the spar caps and transverse ends of the shear web. This configuration, however, does not accommodate relatively large length variances (e.g., shortages) in the shear web and often results in the use of excess bond paste to make up for a length deviation and to achieve the bond width. The excess paste contributes unnecessary weight to the blade and can break off and result in blade "rattling" during operation of the wind turbine (a not uncommon complaint from wind turbine owners/operators). Also, air voids and unpredictable squeeze-out of the bond paste in the typical construction can result in areas of decreased bond strength, which is particularly problematic in sections of the blade where repair is not possible from within the blade.

Accordingly, the industry would benefit from an improved bond configuration between the shear web and spar caps that addresses one or more of the deficiencies of certain conventional configurations.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine blade includes an upper shell member having a spar cap configured on an internal face thereof, and a lower shell member having a spar cap configured on an internal face thereof. A shear web extends between the spar caps along a longitudinal length of the blade. A connection assembly is provided between transverse ends of the shear web and the spar caps. This connection assembly includes a spacer member configured on each of the spar caps. A male/female engagement interface is provided between the transverse end of the shear web and the spacer member. This male/female interface has an axial extension length that accommodates for variances in the shear web length. In this manner, the shear web need not have exact tolerances so as to fit precisely between the spar caps.

In particular embodiments, bond paste is provided in the male/female engagement interface between the transverse end of the shear web and the spacer member. For example, the male/female interface may include a male member that resides within a female recess, with the bond paste extending axially along the male member in the recess. In some embodiments, the recess may be filled at least partially with bond paste before insertion of the male member such that the male member is encased in the bond paste within the female recess.

The male/female interface may be variously configured. For example, in a particular embodiment, the male member is defined on the spacer member, for example with a rectangular cross-sectional shape, and the female recess is defined in the transverse end of the shear web with a complimentary shape. In a different embodiment, the female recess is defined in the spacer member, and the male member is defined on the transverse end of the shear web. The shape, number, and configuration of the male member and female recess may vary widely. In addition to the rectangular shape, any manner of multi-sided or curved engagement profile may be used. In a particular embodiment, the male member has a triangular or other pointed shape and engages in a complimentary shaped recess. This configuration may be desired in that it provides a centering feature for the shear web relative to the spacer member/spar cap.

The engagement interface between the spacer member and the shear web may include various functional structures. For example, the spacer member may have a width at the engagement interface that is greater than a width of the shear web at the engagement interface. In this manner, variances in the width of the shear web are accommodated for by the spacer member. In still other embodiments, the engagement interface has a transverse width engagement section that is generally transverse to the axial engagement interface between the male member within the female recess. This transverse width engagement section may, for example, extend from opposite sides of the axial engagement section.

In certain embodiments, the spacer member is separately formed component that is bonded to the spar cap. In other embodiments, the spacer member is integrally formed with the spar cap, for example by being molded or infused with the spar cap.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which:

FIG. 1 is a perspective view of a conventional wind turbine;

FIG. 2 is a perspective view of a conventional wind turbine blade;

FIG. 3 is a cross-sectional view of an exemplary wind turbine blade incorporating aspects of the invention;

FIG. 4 is an enlarged cross-sectional component view of a connection assembly between a shear web and spar cap in accordance with an embodiment of the invention;

FIG. 5 is an enlarged cross-sectional view of the embodiment of FIG. 4; in an assembled state;

FIG. 6 is an enlarged cross-sectional component view of an alternate embodiment of a connection assembly; and FIG. 7 is an enlarged cross-sectional component view of still another embodiment of a connection assembly.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of turbine blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

FIG. 2 is a more detailed view of a wind turbine blade 16. The blade 16 includes an upper shell member 20 and a lower shell member 22. The upper shell member 20 may be configured as the suction side surface of the blade 16, while the lower shell member 22 may be configured as the pressure side surface of the blade. The blade 16 includes a leading edge 24 and a trailing edge 26, as well as a root portion 28, and a tip portion 30. As is well known in the art, the upper shell member 20, and lower shell member 22 are joined together at the leading edge 24 and trailing edge 26. The blade 16 includes an internal cavity 25 (FIG. 3) in which various structural members, such as spar caps and one or more shear webs, are configured.

FIG. 3 is a cross-sectional view of a wind turbine blade 16 that incorporates aspects of the invention. The blade 16 includes one or more internal structural shear webs 42 that span between the upper 20 and lower shell members 22. In particular, the shear webs 42 span between structural spar caps 32 that are fixed to the internal faces of the shell members 20, 22. In accordance with aspects of the invention, an improved connection assembly 40 is provided at the interface of the shear webs 42 and spar caps 32, as described in greater detail below.

FIGS. 4 and 5 depict an embodiment of a connection assembly 40 between transverse ends 46 of the shear web 42 and the spar caps 42. The connection assembly 40 includes a spacer member 50 configured on the spar cap 32. A male/female engagement interface 56 is provided between the transverse end 46 of the shear web and an engagement face 52 of the spacer member 50. This male/female interface 56 has an axial extension length 62 that accommodates for variances in the length of the shear web 42, as well as provides a structurally secure connection between the shear web 42 and spar cap 32 that does not require significant finishing work.

In particular embodiments, a bond paste 64 is provided in the male/female engagement interface 56 between the transverse end 46 of the shear web 42 and the engagement face 52 of the spacer member 50. The band paste 64 may be applied as a continuous or discontinuous layer between the members, and in any amount to achieve a desired bond paste thickness and width.

The male/female interface 56 may be variously configured. In particular embodiments illustrated for example in the figures, the interface 56 includes a male member 58 defined on one of the members that resides within a female recess 60 defined in the other respected member, with the bond paste 64 extending axially along the male member 58 in the recess. In this way, the length of the bond is effectively increased by incorporating the axial extension length 62 of the interface 56. In some embodiments, the recess 60 may be filled at least partially with bond paste 64 before insertion of the male member 58 such that the male member 58 is encased in the bond paste 64 within the female recess 60, as depicted for example in FIGS. 4 and 5.

In FIGS. 4 and 5, the male/female engagement interface 56, includes the male member 58 defined on the engagement face 52 (FIG. 4) of the spacer shear web 42, for example as a rectangular cross-sectional shaped member. The female recess 60 is defined in the engagement face 52 of the spacer member 50 with a complimentary rectangular cross-sectional shape. It should be readily appreciated that, in different embodiments, the female recess 60 may be defined in the shear web 42, with the male member 58 defined on the spacer member 50, for example as depicted in FIG. 6.

The shape, number, and configuration of the male members 58 and female recesses 60 may vary widely. In addition to the rectangular shape depicted in FIGS. 4 and 5, any manner of multi-sided or curved engagement profile may be used. For example, in the embodiment of FIG. 6, the male member 58 has a triangular or other pointed shape and engages in a complimentary shaped recess 60. This configuration may be desired in that it provides a centering feature for the shear web 42 relative to the spacer member 50 and spar cap 32. Multiple triangular male members 58 may be utilized, for example in a saw-tooth configuration.

The engagement interface 56 between the spacer member 50 and the shear web 42 may include various functional structures. For example, referring to FIGS. 4 and 5, the spacer member 50 may have a width 54 at the engagement interface 56 that is greater than a width 66 of the shear web 42 at the engagement interface. In this manner, variances in the width of the shear web 42 are accommodated for by the spacer member 50. The engagement interface 56 has a transverse width engagement section 70 that is generally transverse to the axial engagement interface 68 of the male member 58 within the female recess 60. This transverse width engagement section 70 may, for example, extend from opposite sides of the axial engagement section 58, as depicted in the figures, or may be configured between opposite axial engagement interfaces 68.

In certain embodiments, for example as depicted in FIGS. 4 through 6, the spacer member 50 is a separately formed component that is bonded to the spar cap 32 with any suitable bonding material 64. In the embodiment of FIG. 7, the spacer member 50 is an integral component of the spar cap 32, for example a co-molded or infused component of the spar cap 32. It should be appreciated that configuration of the spacer member 50 on the spar cap 32 may vary within the scope and spirit of the invention. For example, the spacer member 50 may be provided by a male member 58 or female recess 60 that are provided directly in a thickened section of the spar cap 32 without an intermediate base portion.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A wind turbine blade, comprising:
   an upper shell member having a spar cap configured on an internal face thereof;
   a lower shell member having a spar cap configured on an internal face thereof;
   a shear web extending between said spar caps along a longitudinal length of said blade, said shear web having opposite transverse ends;
   a connection assembly between at least one of said transverse ends of said shear web and a respective said spar cap, said connection assembly further comprising:
   a spacer member configured on said spar cap, said spacer member having a transverse engagement face; and
   a male/female engagement interface between said transverse end of said shear web and said spacer member defined by a male member within a female recess;
   wherein said male/female engagement interface comprises an axial extension length to accommodate for shear web length variances; and
   a transverse width engagement section between said transverse end of said shear web and said transverse engagement face of said spacer member on each opposite side of said male/female engagement interface.

2. The wind turbine blade of claim 1, further comprising bond paste in said male/female engagement interface between said transverse end of said spar cap and said spacer member.

3. The wind turbine blade of claim 2, wherein said bond paste extends axially along said male member in said female recess.

4. The wind turbine blade of claim 3, wherein said male member is encased in said bond paste within said female recess.

5. The wind turbine blade of claim 3, wherein said female recess is defined in said spacer member, and said male member is defined on said transverse end of said shear web.

6. The wind turbine blade of claim 1, wherein said spacer member has a width at said transverse engagement face that is greater than a width of said transverse end of said shear web at said engagement interface.

7. The wind turbine blade of claim 1, wherein said spacer member is separately formed and bonded to said spar cap.

8. The wind turbine blade of claim 1, wherein said spacer member is an integrally formed component of said spar cap.

9. A wind turbine blade, comprising:
   an upper shell member having a spar cap configured on an internal face thereof;
   a lower shell member having a spar cap configured on an internal face thereof;
   a shear web extending between said spar caps along a longitudinal length of said blade, said shear web having opposite transverse ends;
   a connection assembly between at least one of said transverse ends of said shear web and a respective said spar cap, said connection assembly further comprising:
   a spacer member configured on said spar cap;
   a male/female engagement interface between said transverse end of said shear web and said spacer member defined by a male member within a female recess;
   wherein said male/female engagement interface comprises an axial extension length to accommodate for shear web length variances;
   wherein said spacer member has a transverse engagement face with a transverse width; and
   wherein said male member is defined on said engagement face of said spacer member and has a transverse width that is less than said transverse width of said engagement face, and said female recess is defined in said transverse end of said shear web.

\* \* \* \* \*